May 31, 1949.  M. I. DORFAN  2,472,053
DUST COLLECTOR FOR SHUTTLE FEED CONVEYERS
Filed Oct. 26, 1946  2 Sheets-Sheet 1

INVENTOR.
Morton I. Dorfan
BY
Albert M. Austin
his ATTORNEY

May 31, 1949.  M. I. DORFAN  2,472,053
DUST COLLECTOR FOR SHUTTLE FEED CONVEYERS
Filed Oct. 26, 1946  2 Sheets-Sheet 2

INVENTOR.
Morton I. Dorfan
BY Albert M. Austin
his ATTORNEY

Patented May 31, 1949

2,472,053

UNITED STATES PATENT OFFICE 2,472,053

DUST COLLECTOR FOR SHUTTLE FEED CONVEYERS

Morton I. Dorfan, Pittsburgh, Pa., assignor to American Wheelabrator & Equipment Corporation, a corporation of Delaware Application October 26, 1946, Serial No. 706,039

6 Claims. (Cl. 209—147)

This invention relates to installations for collecting dust and fumes and provides an improved device and means for the collection of dust and fumes from any one of a plurality of stations arranged substantially in line and extending over a substantial distance.

In the operation of coal bins or bins for the storage of other dust producing materials it is necessary to remove dust or fumes at any one of a great number of stations or bins generally arranged end to end over a substantial distance. In installations of this kind it is difficult to provide an exhaust passage from the bin where de-dusting or de-fuming is to take place to the filtering and exhausting plant which by reason of its size must necessarily be stationary. The distances encountered in installations of this character are so great that use of flexible duct connections from the exhausting plant to the stations are cumbersome, expensive and impractical besides necessitating manual operations for connecting the flexible duct to the respective station.

These and other disadvantages and shortcomings are effectively overcome by the present invention, which provides a simple yet effective installation which is automatically adjusted to withdraw dust and fumes at the proper station where development of dust and fume takes place at the time.

Coal bins, for example, are generally arranged end to end and are charged or filled with coal to be stored therein by a so-called shuttle conveyor, comprising an endless belt which receives coal at some central point of the installation and carries it to, and unloads it at, any of the bins. The shuttle conveyor is movable as a unit so that its discharge end may be brought into registry with any of the bins. The movement of the conveyor is generally parallel to the direction in which its belt extends, but it may also be at an angle thereto or at right angles, the result being the same in all such instances that the discharge end may be brought over any one of a great number of bins or stations arranged in line and covering a substantial distance. In most instances the shuttle conveyor is reversible so that coal or other material may be discharged at either end of the conveyor.

Installations embodying the present invention basically comprise an elongated chamber extending the length of the stations where dust or fumes are to be exhausted. One of the walls of the chamber is formed by a movable belt having an aperture in it which may be brought into registry with any one of the said stations, thus providing for a connection between the station and the chamber from which air, dust and fumes are continuously exhausted by a suitable filtering and exhausting plant of otherwise conventional construction. In installations where the object is the removal of dust created by the unloading of coal from a shuttle conveyor, the belt which forms one wall of the chamber is synchronized with the movement of the conveyor so that the aperture in the belt establishes a passage with that particular bin into which coal is being unloaded at the time.

The various objects, features and advantages of the invention will appear more fully from the detailed description which follows accompanied by drawings showing for the purpose of illustration a preferred embodiment of the invention.

The invention also consists in certain new and original features of construction and combination of parts hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description, taken in connection with the accompanying drawings, forming a part of it in which Fig. 1 is a sectional side view, simplified and partly diagrammatic, of a dust collector installation for a shuttle conveyor unloading coal into bins, a section being taken on line 1—1 of Fig. 2

Figure 1:
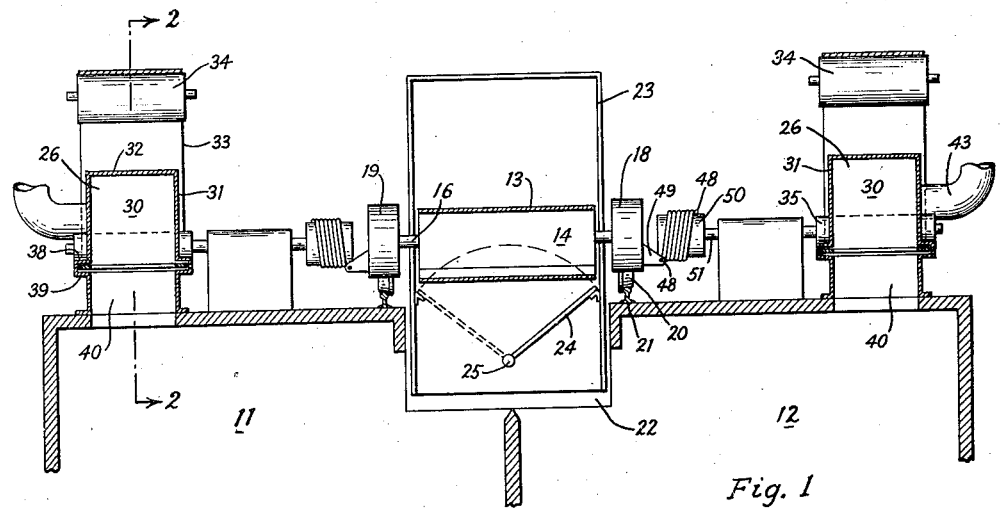
Figure 2:
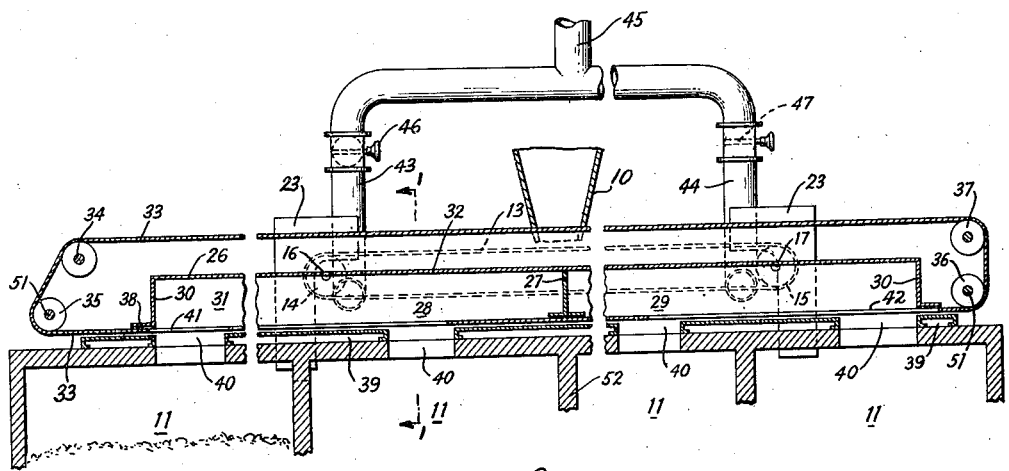
Fig. 2 is a sectional end view of the installation shown in Fig. 1.
Figure 3:
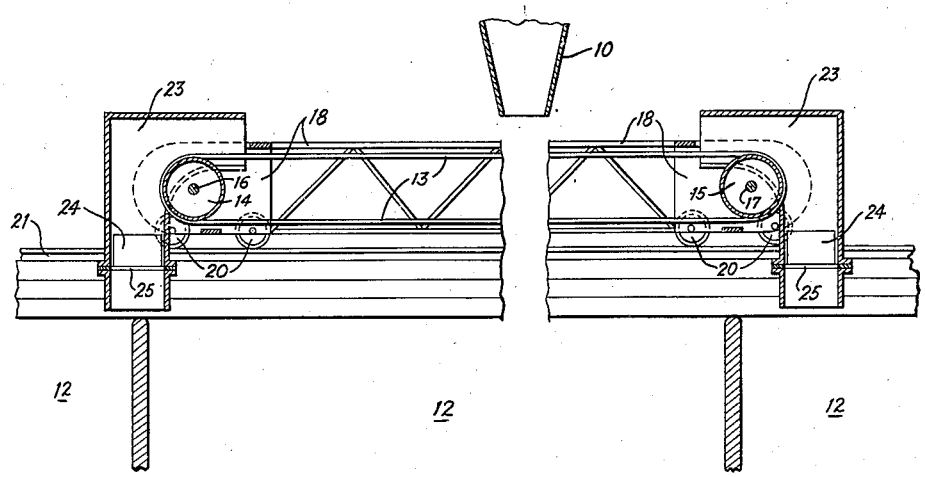
Figure 3 is a sectional view of the shuttle conveyor, the section being taken on line 3—3 of Figure 1.

In the following description and in the claims the term "dust" is employed in a generic sense and is deemed to comprise all objectionable matter which can be moved in the same manner as dust by a vacuum system. Various other details will be identified by specific name for convenience. The names, however, are intended to be as generic in their application as the art will permit.

Like reference characters refer to like parts in the drawings. In the drawings accompanying, and forming part of, this specification certain specific disclosure of the invention is made for the purpose of explanation of broader aspects of the invention, but it is understood that the details may be modified in various respects without departure from the principles of this invention, and that the invention may be applied to other structures than the ones shown.

In the installations shown in the drawings a plurality of storage bins 11 and 12 are arranged side by side in pairs and the pairs are arranged end to end. The material to be stored therein, such as coal, may be withdrawn from the bottom of the bins (not shown) and the bins are charged and loaded from the top by an endless conveyor belt 13 trained over end rollers 14 and 15. The conveyor is supplied with coal from a chute 10. The end rollers have shafts 16 and 17 mounted in carriages 18 and 19 whose wheels 20 run on rails 21 along the center of the bin installation to either side of a loading channel 22 leading into the interior of the series of bins 11 and 12.

A hood 23 is associated with each end of the belt 13 and is mounted on the respective carriage 18 and 19. The hood directs coal or other material which drops off the end of the conveyor into the channel 22 and prevents appreciable amounts of dust from escaping upwardly into the atmosphere. Each hood has a movable baffle or deflector plate 24 built into it pivoted about the shaft 25 to direct the material into the bin 11 or 12, depending upon its position. The conveyor belt 13 is driven by a suitable motor (not shown) in one or both of the carriages 18 and 19.

The arrangement so far described is more or less conventional and may assume various other forms depending on the particular local conditions and requirements.

The de-dusting and de-fuming installation comprises an elongated chamber 26 for each of the two rows of bins 11 and 12. The chambers 26 are partitioned by a central wall 27 into sub-chambers 28 and 29 lying to either side of the wall 27. The chamber 26 has permanent enclosing end walls 30, side walls 31 and top walls 32, the bottom of the chamber being formed by an endless belt 33 trained around rollers 34, 35, 36 and 37. The bottom rim of the endless belt 33 is guided between a top flange 38 on the chamber structure and a bottom platform 39 on the top wall of the bins having exhaust apertures 40 leading into each of the bins below. The endless belt 33 has two apertures 41 and 42, each associated with the sub-chambers 28 and 29 respectively for providing communication between the subchambers and the exhaust aperture 40 of the bin with which the belt aperture is in registry.

Air is withdrawn from the subchambers 28 and 29 through suction branch ducts 43 and 44 and a central suction duct 45 leading to an exhausting and filtering plant of suitable construction (not shown). The suction branch ducts 43 and 44 have valves 46 and 47, permitting air to be withdrawn through branch duct 43 or branch duct 44, and accordingly, from one end of the shuttle conveyor belt 13 or the other, depending on the direction in which the shuttle conveyor belt 13 is run, it being apparent that coal may be dumped at either end of the shuttle conveyor belt simply by running the conveyor in one direction or the other.

The apertures 41 and 42 in the endless belt 33 forming the bottom wall of the chamber 26 are preferably elongated and centered with respect to the discharge point of the shuttle conveyor 13 for a purpose which will become apparent from a consideration of the operation of the installation described further below.

The belt 33 with its apertures 41 and 42 is adjusted with respect to the stations from which dust is to be exhausted by making it follow the position of the shuttle conveyor relatively to the bins. This may be accomplished in any convenient manner, either purely mechanically or electrically, depending on the particular conditions encountered. The drawings illustrate a mechanical means comprising cables 48 connected to the carriages 18 and 19 by brackets 49. The cables are wound on, or unwound from, drums 50 on a shaft 51 connected to appropriate rollers 35 and 36 over which the belt 33 runs. In this manner the apertures 41 and 42 are adjusted to follow the shifts of the shuttle conveyor relatively to the bins, more particularly to follow the position of the hoods 23 which direct the coal into the bins.

The operation of the device is as follows: Assuming the coal bins at the left hand side of Fig. 1 are to be filled with coal, the shuttle conveyor 13 is run in counterclock-wise direction so that the coal is discharged at the left end of the shuttle conveyor. The valve 47 in the branch duct 44 is closed and the valve 46 in the branch duct 43 is opened so that air is being exhausted from sub-chamber 28.

In the position shown in Fig. 1 the bin 11 farthest to the left has just been filled, but dust is still rising from the coal. This dust is being exhausted through the exhaust aperture 40 which is in communication with the sub-chamber 28 through the aperture 41 in the belt 33. The aperture 41 extends to the exhaust aperture 40 of the adjacent bin into which coal is now discharged as the hood 23 of the shuttle conveyor moves slowly over the partition between the two bins.

As the shuttle conveyor gradually advances to fill the next bin 11 from the left partition wall to the right, the exhaust aperture 40 of the last filled bin is gradually being closed as the dust developed by its filling either settles or is exhausted. As the hood 23 passes over the central portion of the bin 11 now being filled, the aperture 41 in the belt maintains communication between the bin and the sub-chamber 28, and dust continues to be exhausted therefrom until after the filling of the bin is completed, as was previously described. As the hood 23 approaches the next partition wall between bins, the aperture 41 in the belt 33 comes into registry with the next exhaust aperture so that communication between the next bin and the exhausting system is established before the filling of the next bin begins.

Throughout the filling operation the shuttle conveyor moves slowly from bin to bin and the aperture 41 in the belt 33 which forms the bottom of the extended chamber 26 moves with it. As the partition wall 52 in the center of all the coal bins is approached the shuttle conveyor is stopped and reversed so that coal is discharged from its other end. At the same time the valve 46 in the suction branch duct 43 is closed and the valve 47 in the suction branch duct 44 is opened to connect the sub-chamber 29 into the exhausting system. The shuttle conveyor then gradually advances from the right to the left to fill the bins at the other end of the installation. During this period the aperture 42 in the belt 33 establishes communication with the several exhaust apertures 40 in the same manner as hereinbefore described.

The invention thus provides a simple and efficient device for the removal of dust and fumes from any one of the series of stations arranged in line over a substantial distance. The broad concept of the invention lends itself to adaptation to various types of installations and numerous changes, additions, omissions, modifications or substitutions may be made for this purpose without departure from the spirit and the teaching of this invention. It is of course not necessary that a shuttle conveyor be employed for loading of the bins with material to be stored therein, since evidently other loading devices may be employed with which the invention can be combined with equal benefit. All such changes and modifications therefore do not involve a departure from the broader aspects of the invention.

What is claimed is:

1. In an installation for the removal of dust from a plurality of stations, particularly bins, each station being provided with a dust exhaust port, all dust exhaust ports being arranged in line, the station being chargeable by a loading means adapted to be moved into unloading position with respect to any of said stations, the combination of an elongated suction chamber extending the length of said stations adjacent said exhaust ports; a movable belt forming a wall of said chamber, said belt normally covering said exhaust ports and having an aperture therein through which air is admitted into said chamber, said aperture being movable into registry with any of said ports; means for exhausting air from said chamber; and means for moving said belt relatively to the remainder of the suction chamber to follow with its aperture the position of said movable loading means, whereby dust may be removed at any of the stations being loaded without the use of flexible duct connections.

2. In an installation for the removal of dust from a plurality of stations, each station being provided with a dust exhaust port, all dust exhaust ports being arranged in line, the combination of an elongated suction chamber extending the length of said stations adjacent said exhaust ports; a movable belt forming a wall of said chamber towards said ports and normally closing said ports with respect to said chamber, said belt having an aperture therein through which air is admitted into said chamber, said aperture being movable into registry with any of said ports; means for moving said belt to bring said aperture into registry with any one of a predetermined number of ports; and means for exhausting air from said chamber, whereby dust may be removed from any of a number of stations without the use of flexible dust connections.

3. An installation for the removal of dust from a plurality of stations, each station being provided with a dust exhaust port, all dust exhaust ports being arranged in line, the installation comprising, in combination, a shuttle conveyor movable into unloading position with respect to any of said stations; an elongated suction chamber extending adjacent said ports; a movable belt forming a wall of said chamber adjacent said ports, said belt having an aperture therein through which air is admitted into said chamber, said aperture being movable into registry with any of said ports by adjustment of the belt relatively to the remainder of said chamber; means for exhausting air from said chamber; and means for adjusting said belt to follow the position of said shuttle conveyor.

4. An installation for the removal of dust from a plurality of bins, each bin being provided with a dust exhaust port, all dust exhaust ports being arranged in line, the installation comprising, in combination, a shuttle conveyor movable into unloading position with respect to any of said bins; a suction chamber extending the length of said bins adjacent said exhaust ports; a movable belt forming a wall of said chamber, said belt having elongated aperture therein through which air is admitted into said chamber, said aperture being sufficiently large to extend over two adjacent ports simultaneously so that the interior of said suction chamber may be brought into communication with two bins simultaneously; means for exhausting air from said chamber; and means for moving said belt relatively to the remainder of the suction chamber to follow the position of said shuttle conveyor.

5. An installation for the removal of dust from a plurality of stations each station being provided with a dust exhaust port, all dust exhaust ports being arranged in line, the installation comprising, in combination, a shuttle conveyor including a reversible conveyor or belt, the conveyor being movable into unloading position with respect to any of said stations, the shuttle conveyor being adapted to discharge material at one of its ends, or at the other, depending on the direction in which its belt is being driven; a suction chamber extending the length of said stations adjacent said exhaust ports, the chamber being partitioned into two subchambers arranged end to end; a movable belt forming a wall of said chamber, said wall belt having two apertures therein, each aperture being associated with one of said subchambers, the wall belt normally closing said ports with respect to said subchambers except at said apertures which provide communication between said suction chamber and said ports at the location of the respective apertures; means for selectively exhausting air from one or the other of said subchambers depending on the direction in which the shuttle conveyor is run, and means for adjusting the wall belt to cause its apertures to follow the position of said shuttle conveyor.

6. An installation for the removal of dust from a plurality of stations each station being provided with a dust exhaust port, all dust exhaust ports being arranged in line, the installation comprising, in combination, a shuttle conveyor including a reversible conveyor belt, the conveyor being movable into unloading position with respect to any of said stations, the shuttle conveyor being adapted to discharge material at one of its ends, or at the other, depending on the direction in which its belt is being driven; a suction chamber extending the length of said stations adjacent said exhaust ports, the chamber being partitioned into two subchambers arranged end to end; a movable belt forming a wall of said chamber, said wall belt having two elongated apertures therein, each aperture being associated with one of said subchambers, each aperture being large enough to extend simultaneously over two adjacent exhaust ports, the wall belt normally closing said ports with respect to said subchambers except at said apertures which provide communication between said suction chamber and said ports at the location of the respective apertures; means for selectively exhausting air from one or the other of said subchambers depending on the direction in which the shuttle conveyor is run, and means for adjusting the wall belt to cause its apertures to follow the position of said shuttle conveyor.

MORTON I. DORFAN.

REFERENCES CITED

The following references are of record in the file of this patent:

UNITED STATES PATENTS

| Number | Name | Date |
|---|---|---|
| 8,856 | Gally | Aug. 19, 1879 |
| 1,629,991 | Budd et al. | May 24, 1927 |
| 1,813,097 | Stoddard | July 7, 1931 |
| 2,292,652 | Osgood | Aug. 11, 1942 |